United States Patent
Oh et al.

(10) Patent No.: US 7,529,205 B2
(45) Date of Patent: May 5, 2009

(54) BEACON SCHEDULING METHOD AND SYSTEM IN A NETWORK SYSTEM

(75) Inventors: Seung-hwan Oh, Suwon-si (KR); Soon-jin Choi, Seongnam-si (KR); Min-seop Jeong, Seoul (KR); Jong-hun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 11/271,879

(22) Filed: Nov. 14, 2005

(65) Prior Publication Data

US 2006/0104250 A1      May 18, 2006

Related U.S. Application Data

(60) Provisional application No. 60/627,017, filed on Nov. 12, 2004.

(30) Foreign Application Priority Data

Sep. 8, 2005     (KR)    ........................ 10-2005-0083835

(51) Int. Cl.
    *H04Q 7/20*     (2006.01)

(52) U.S. Cl. ...................................... 370/329; 370/338
(58) Field of Classification Search ................ 370/328, 370/329, 338, 345, 401, 458
See application file for complete search history.

(56) References Cited

U.S. PATENT DOCUMENTS

| | | | | |
|---|---|---|---|---|
| 7,388,857 | B2 * | 6/2008 | Sharma ....................... | 370/350 |
| 2005/0249173 | A1 * | 11/2005 | Salokannel et al. ......... | 370/338 |
| 2006/0007907 | A1 * | 1/2006 | Shao et al. .................. | 370/347 |
| 2006/0089964 | A1 * | 4/2006 | Pandey et al. ............... | 709/203 |
| 2006/0104241 | A1 * | 5/2006 | Kim ............................ | 370/329 |
| 2007/0165589 | A1 * | 7/2007 | Sakoda ........................ | 370/345 |

* cited by examiner

*Primary Examiner*—Min Jung
(74) *Attorney, Agent, or Firm*—Sughrue Mion, PLLC

(57) ABSTRACT

A beacon scheduling method and system in a network system. The beacon scheduling method of a router in a network system that includes at least one router, includes receiving a beacon signal from a parent node; calculating a difference between an address of the parent node and an address of the router; and setting the calculated difference to a beacon transmission offset of the router. Accordingly, all devices from the top to the bottom of the network can transmit their beacons without collisions, and thus the multi-hop tree structure can be established.

16 Claims, 4 Drawing Sheets

Parent

Child

Beacon Tx offset

BEACON COLLISION AREA

BEACON SCHEDULING METHOD AND SYSTEM IN A NETWORK SYSTEM

CROSS-REFERENCE TO RELATED APPLICATIONS

This application claims the benefit under 35 U.S.C. §119 (e) of U.S. Provisional Application No. 60/627,017 filed on Nov. 12, 2004 in the United States Patent and Trademark Office, and priority from Korean Patent Application No. 2005-83835 filed on Sep. 8, 2005 in the Korean Intellectual Property Office, the entire disclosures of which are incorporated herein by reference.

BACKGROUND OF THE INVENTION

1. Field of the Invention

Methods and systems consistent with the present invention relate to a beacon scheduling in a network system, and more particularly, to beacon scheduling of a router in a network system to prevent a beacon conflict.

2. Description of the Related Art

In a ZigBee network topology, nodes in a network system are divided into a ZigBee coordinator (ZC), a ZigBee router (ZR), and a ZigBee end device (ZE).

The ZC is on the top of a tree structure and responsible for managing the tree. The ZR is below the ZC and responsible for relaying a beacon transmitted from the ZC to its child nodes (i.e., ZEs or other ZRs) so that the tree structure can be expanded.

The ZE is at the bottom of the network topology. The ZE synchronizes using the beacon transmitted from the ZR and the ZC, and performs communications.

To form such a tree structure, ZRs need to relay beacons received from ZCs to their child nodes. At this time, if the transmission point of the beacons is randomly selected by the ZRs, the beacons are subject to collisions at the child nodes. These beacon collisions block the communications between the nodes.

FIG. 1 illustrates a conventional beacon scheduling method. According to ZigBee NWK v.0.92 (02130r9ZB_NWK_Network-Specification V092), in a case that a ZR is connected as a child node to a parent node which regularly transmits beacons throughout the tree topology, the ZR first schedules its beacons transmission by tracking the beacons of the parent node prior to its beacon transmission to its child node, and transmits its beacons by intervals of a beacon transmission (Tx) offset.

FIGS. 2A and 2B illustrate a problem of the conventional beacon scheduling method.

It is assumed that two child nodes (child 1 and child 2) are connected to the same parent node and receive beacons from the parent node but do not know each other in their respective regions.

Referring first to FIG. 2A, since the child 1 and the child 2 cannot track beacons of the other, the same beacon Tx offset may be used based on the beacons of the parent node.

Referring to FIG. 2B, in the hatched area where the coverage of the child 1 and the child 2 overlaps, the beacons from the child 1 and the child 2 collide. As a result, no child node within the overlapping region can receive the beacons from the child 1 and the child 2.

SUMMARY OF THE INVENTION

The present invention provides a beacon scheduling method of a router to prevent beacon collisions in a network system.

According to an aspect of the present invention, there is provided a beacon scheduling method of a router in a network system that includes at least one router, includes receiving a beacon signal from a parent node; calculating a difference between an address of the parent node and an address of the router; and setting the calculated difference to a beacon Tx offset of the router.

The beacon scheduling method may further include transmitting a beacon of the router when the beacon Tx offset elapses after the beacon signal is received from the parent node.

The beacon scheduling method may further include calculating a difference between the address of the router and an address of another router that receives the beacon from the router, and setting the calculated difference to a beacon Tx offset of the another router.

The beacon received from the parent node may contain information relating to the address of the parent node.

The beacon of the router may contain information relating to the address of the router.

An address of the parent node and the address of the at least one router may be independently determined.

The parent node may be a coordinator.

The beacon scheduling method may further include receiving the address of the router.

According to an aspect of the present invention, there is provided a network system that includes at least one router includes a first router which receives a beacon signal from a parent node, calculates a difference between an address of the parent node and an address of the first router, and sets the calculated difference to a beacon Tx offset; and a certain device which receives the beacon from the first router.

The first router may transmit a beacon of the second router when the beacon Tx offset elapses after the beacon signal is received from the parent node.

The certain device may calculate a difference between the address of the first router and an address of the certain device, and set the calculated difference to a beacon Tx offset of the certain device.

The beacon received from the parent node may contain information relating to the address of the parent node.

The beacon of the first router may contain information relating to the address of the first router.

An address of the parent node and the address of the at least one router may be independently determined.

The parent node may be a coordinator.

The first router may receive the address of the first router in advance.

BRIEF DESCRIPTION OF THE DRAWINGS

The above and/or other aspects of the invention will become apparent and more readily appreciated from the following description of exemplary embodiments, taken in conjunction with the accompanying drawing figures of which.

DETAILED DESCRIPTION OF EXEMPLARY EMBODIMENTS OF THE INVENTION

Figure 1:
FIG. 1 depicts a conventional beacon scheduling method.
Figure 1:
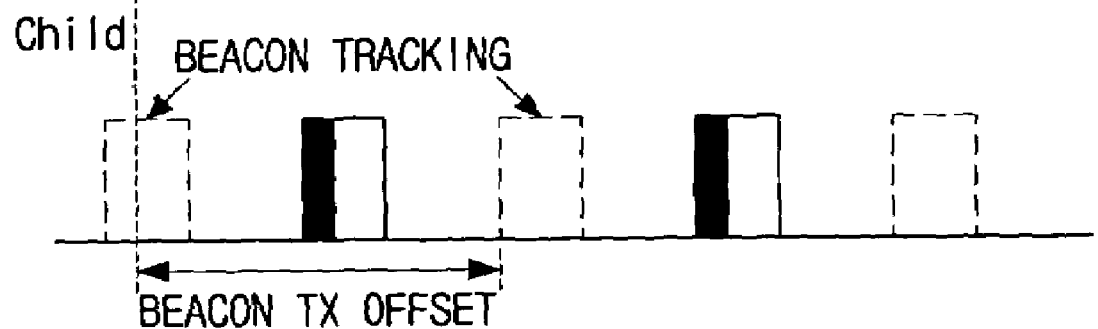
Figure 2A:
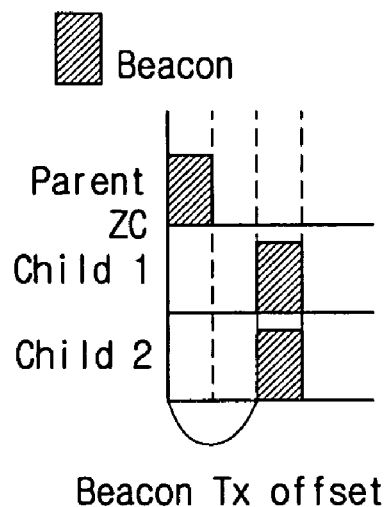
FIGS. 2A and 2B depict a problem of the conventional beacon scheduling method.
Figure 2B:
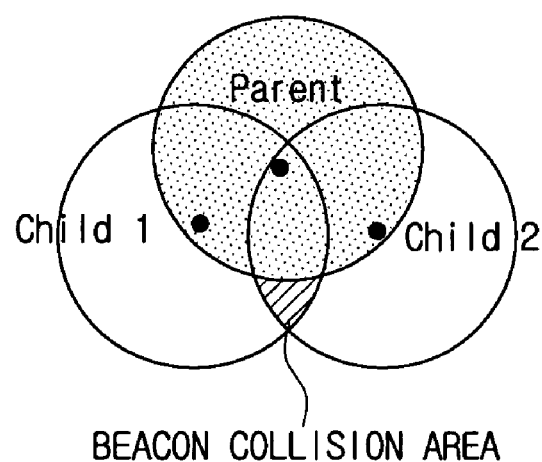

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3:
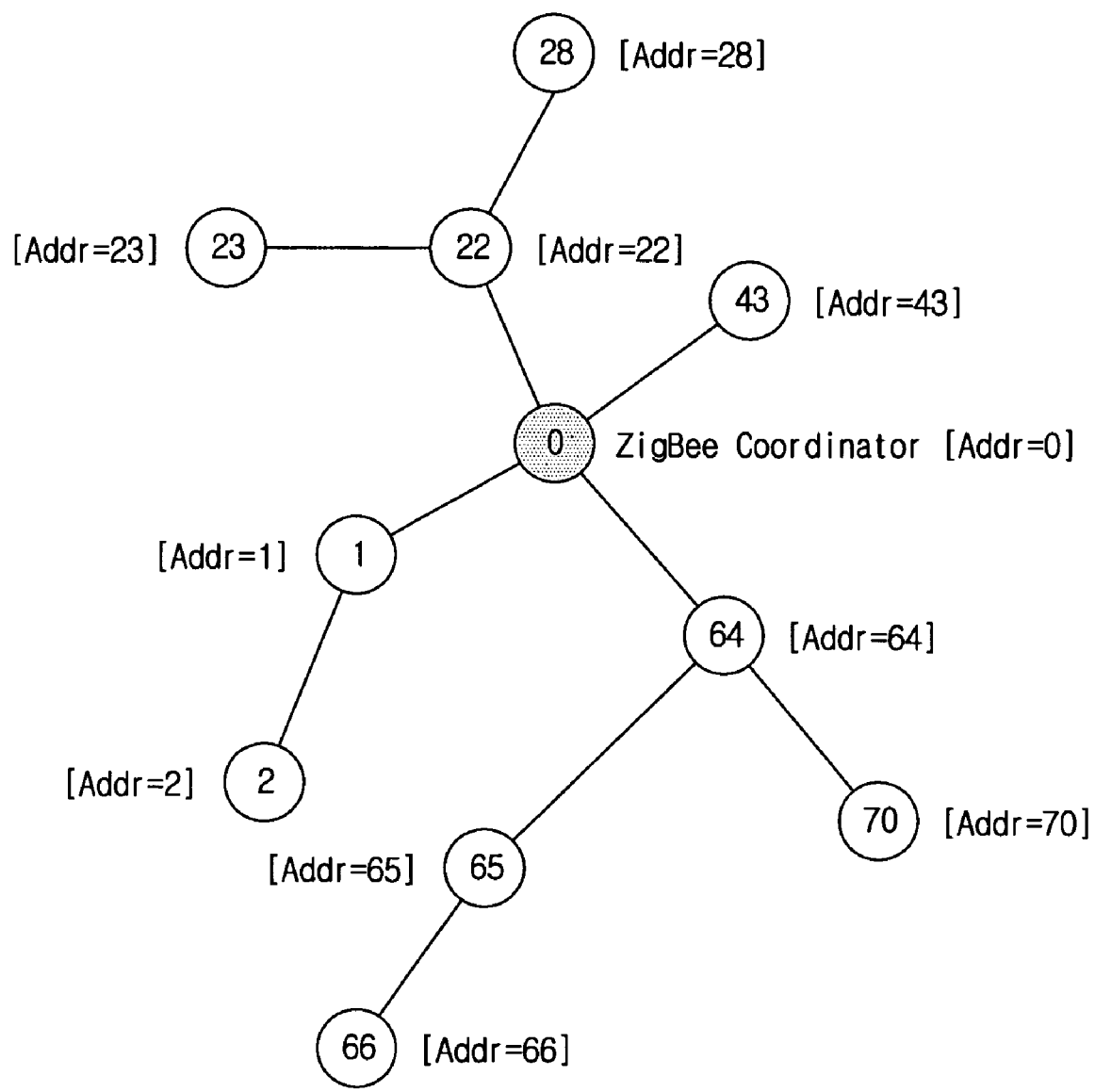
FIG. 3 depicts a schematic structure of a network system according to an exemplary embodiment of the present invention.

FIG. 3 is a schematic diagram of a structure of a network system according to an exemplary embodiment of the present invention. The network system includes a ZC, being a node 0, and a plurality of ZRs being a node 1, a node 2, a node 22, a node 23, a node 28, a node 43, a node 64, a node 65, a node 66, and a node 70.

In FIG. 3, addresses are separately assigned to the ZRs forming a network, and each node is aware of its address. According to an exemplary embodiment of the present invention, the address may be a node number.

An address of the ZC being the node 0 is '0'. When transmitting a beacon to its child nodes, the ZC appends information relating to its address to the beacon. Likewise, each ZR appends information relating to its address to a beacon and transmits the beacon to its child nodes.

Referring to FIG. 3, the ZC (the node 0) has the node 1, the node 22, the node 43, and the node 64 as its child nodes. The node 22 has the node 23, and the node 28 as its child nodes. The node 2 is a child node of the node 1. The node 65 and the node 70 are child nodes of the node 64. The node 66 is a child node of the node 65.

According to an exemplary embodiment of the present invention, each ZR, determines its beacon transmission time by checking an address of its parent node based on the beacon received from the parent node and calculates a difference between the checked address and its address.

Next, the ZR sets the calculated difference to a beacon Tx offset (the number of beacon slots to be delayed) for the beacon transmission.

In further detail, the ZR receives the beacon from its parent node and transmits a beacon to the child node by delaying the beacon as much as the beacon Tx offset (the number of beacon slots to be delayed).

The beacon Tx offset can be calculated based on Equation 1.

$$\text{Number of slots} = ADDR - ADDR_{parent} \quad \text{[Equation 1]}$$

In Equation 1, notably, the beacon Tx offset, that is, the number of beacon slots to be delayed is the difference between the address (ADDR) of the ZR receiving the beacon and the address ($ADDR_{parent}$) of the parent node.

Figure 4:
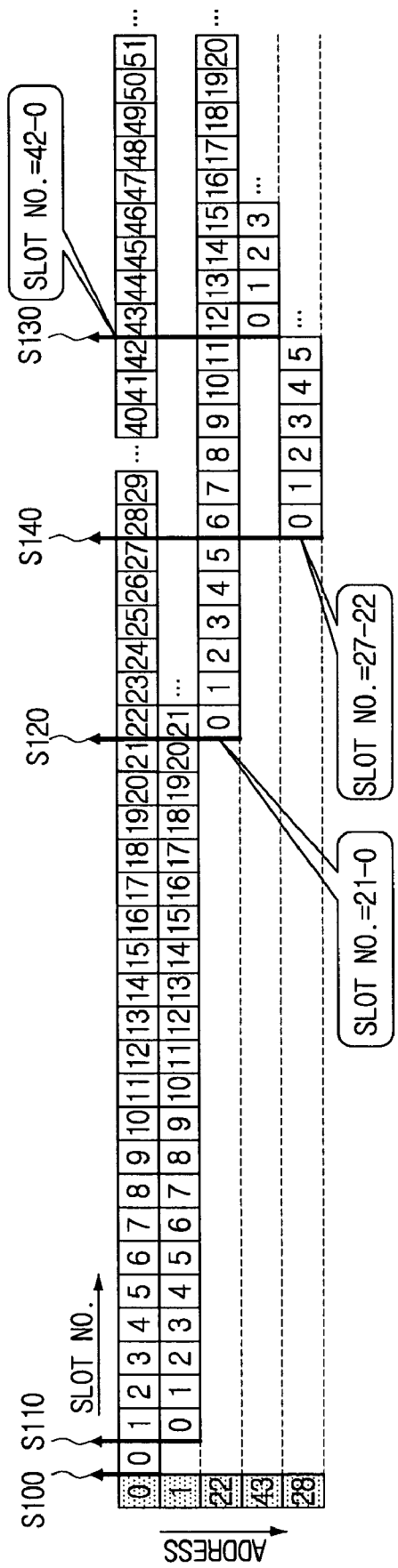
FIG. 4 depicts a beacon scheduling method according to an exemplary embodiment of the present invention.

FIG. 4 depicts the beacon scheduling method according to an exemplary embodiment of the present invention. In FIG. 4, a column on the left indicates the address of the nodes, and a row indicates the beacon transmission time period of the ZRs in accordance with the address in the column.

Referring now to FIGS. 3 and 4, the ZC having the address '0' transmits a beacon to its child node (S100). The beacon transmitted from the ZC contains information that the address of the ZC is '0'. The node 1, which is the child node of the ZC, upon receiving the beacon, confirms that the address of the parent node is '0' and calculates the difference from its address '1' to '1'. The calculated difference '1' becomes the beacon Tx offset of the node 1. The ZR (the node 1) transmits its beacon by delaying the beacon as much as the beacon Tx offset '1' from the beacon transmission time period of the ZC which is the parent node (S110).

The another child node 22 of the ZC, which receives the beacon from the ZC at the same time, confirms that the address of the parent node is '0', and calculates the difference '22' from the its address '22'. The calculated difference '22' becomes the beacon Tx offset of the node 22. The ZR (the node 22) transmits its beacon by delaying the beacon as much as the beacon Tx offset '22' from the beacon transmission time period of the ZC which is the parent node (S120).

The yet another child node 43 of the ZC, which receives the beacon from the ZC at the same time, confirms that the address of the parent node is '0', and calculates the difference '43' from the its address '43'. The calculated difference '43' becomes the beacon Tx offset of the node 43. The ZR (the node 43) transmits its beacon by delaying the beacon as much as the beacon Tx offset '43' from the beacon transmission time period of the ZC which is the parent node (S130).

The still another child node 64 of the ZC, which receives the beacon from the ZC at the same time, confirms that the address of the parent node is '0', and calculates the difference '64' from the its address '64'. The calculated difference '64' becomes the beacon Tx offset of the node 64. The ZR (the node 64) transmits its beacon by delaying the beacon as much as the beacon Tx offset '64' from the beacon transmission time period of the ZC which is the parent node.

As can be seen, the address of the ZC is fixed, and the separate addresses are assigned to the one-hop ZRs (the node 1, the node 22, the node 43, and the node 64) that receive the beacon from the ZC at the same time. As result, the one-hop ZRs of the ZC calculate the different beacon Tx offsets, respectively.

The ZRs (the node 1, the node 22, the node 43, and the node 64) receiving the beacon from the ZC have separate beacon transmission time periods which are independent from each other. Accordingly, there is little chance of the conflict between the beacons received from the node 1, the node 22, the node 43, and the node 64 at the one-hop child nodes of the one-hop ZRs (the node 1, the node 22, the node 43, and the node 64) of the ZC.

As described above, the beacon scheduling method at the ZR is carried out in sequence from the beacon transmission throughout the tree topology.

Specifically, when the node 23 and the node 28 are ZRs and receive the beacon from the ZR which is the node 22, the same beacon scheduling method is applied to them.

The node 28, upon receiving the beacon from the node 22, confirms that the address of the parent node is '22', and calculates the difference '6' from the its address '28'. The calculated difference '6' becomes the beacon Tx offset of the node 28. The ZR (the node 28) transmits its beacon by delaying the beacon as much as the beacon Tx offset '6' from the beacon transmission time period of the parent node 22 (S140).

Another child node 23, which receives the beacon from the 22 at the same time, confirms that the address of the parent node is '22', and calculates the difference '1' from the its address '23'. The calculated difference '1' becomes the beacon Tx offset of the node 23. The ZR being the node 23 transmits its beacon by delaying the beacon as much as the beacon Tx offset '1' from the beacon transmission time period of the parent node 22.

Notably, the address of the parent node 22 is fixed, and the separate addresses are assigned to the one-hop ZRs (the node 23 and the node 28) that receive the beacon from the node 22 at the same time. As result, the one-hop ZRs (the node 23 and the node 28) of the node 22 independently calculate the different beacon Tx offsets.

The ZRs (the node 23 and the node 28) receiving the beacon from the node 23 have the separate beacon transmission time periods independently from each other. Accordingly, there is little chance of the conflict between the beacons received from the node 23 and the node 28 at the one-hop child nodes of the one-hop ZRs (the node 23 and the node 28) of the node 22.

In the exemplary embodiment of the present invention, the beacon cycle is limited and thus the number of the time periods (beacon slots) in the beacon cycle is also restricted. On this account, the number of the ZRs and the number of the addresses to be assigned to the ZRs are also limited. Note that a device having no assigned address serves as a ZigBee end node.

As set forth, the ZRs forming the network determine their beacon transmission periods by themselves. Hence, the beacon conflict can be resolved without using additional complex algorithms. In addition, it is possible to avoid the beacon collision that may probably occur in the tree topology according to the characteristic of the ZigBee network.

Furthermore, the present invention can be applied to home automation, factory automation, etc.

According to an exemplary embodiment of the present invention, all devices from the top to the bottom of the network can transmit their beacons without collisions, and thus the multi-hop tree structure can be established.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A beacon scheduling method of a router in a network system, the method comprising:
    receiving at the router a beacon from a parent node;
    calculating a difference between an address of the parent node and an address of the router; and
    setting a beacon transmission offset of the router as the calculated difference.

2. The beacon scheduling method of claim 1, further comprising transmitting a beacon from the router when the beacon transmission offset elapses after the beacon signal is received from the parent node.

3. The beacon scheduling method of claim 2, further comprising:
    calculating a difference between the address of the router and an address of another router that receives the beacon from the router; and
    setting a beacon transmission offset of the other router as the calculated difference.

4. The beacon scheduling method of claim 1, wherein the beacon received from the parent node contains information relating to the address of the parent node.

5. The beacon scheduling method of claim 2, wherein the beacon of the router contains information relating to the address of the router.

6. The beacon scheduling method of claim 1, wherein the address of the parent and the address of the router are independently determined.

7. The beacon scheduling method of claim 1, wherein the parent node is a coordinator.

8. The beacon scheduling method of claim 1, further comprising receiving at the router the address of the router.

9. A network system that includes at least one router, the system comprising:
    a first router which receives a first beacon from a parent node, calculates a difference between an address of the parent node and an address of the first router, sets a beacon transmission offset as the calculated difference, and transmits a second beacon according to the beacon transmission offset; and
    a device which receives the second beacon from the first router.

10. The network system of claim 9, wherein the first router transmits the second beacon when the beacon transmission offset elapses after the first beacon is received from the parent node.

11. The network system of claim 10, wherein the device calculates a difference between the address of the first router and an address of the device, and sets the calculated difference as a beacon transmission offset of the device.

12. The network system of claim 9, wherein the first beacon received from the parent contains information relating to the address of the parent node.

13. The network system of claim 10, wherein the second beacon transmitted by the first router contains information relating to the address of the first router.

14. The network system of claim 9, wherein the address of the parent node and the address of the first router are independently determined.

15. The network system of claim 9, wherein the parent node is a coordinator.

16. The network system of claim 9, wherein the first router receives the address of the first router.

* * * * *